US010979327B2

(12) United States Patent
Ribenzaft et al.

(10) Patent No.: US 10,979,327 B2
(45) Date of Patent: Apr. 13, 2021

(54) MONITORING CLOUD COMPUTING

(71) Applicant: EPSAGON LTD., Tel Aviv (IL)

(72) Inventors: Ran Ribenzaft, Holon (IL); Nitzan Shapira, Tel Aviv (IL)

(73) Assignee: EPSAGON LTD., Tel Aviv (IL)

( * ) Notice: Subject to any disclaimer, the term of this patent is extended or adjusted under 35 U.S.C. 154(b) by 0 days.

(21) Appl. No.: 16/655,277

(22) Filed: Oct. 17, 2019

(65) Prior Publication Data

US 2020/0127908 A1    Apr. 23, 2020

Related U.S. Application Data

(60) Provisional application No. 62/746,887, filed on Oct. 17, 2018.

(51) Int. Cl.
| | |
|---|---|
| *H04L 12/26* | (2006.01) |
| *H04L 12/24* | (2006.01) |
| *H04L 29/08* | (2006.01) |
| *G06F 9/455* | (2018.01) |

(52) U.S. Cl.
CPC ............ *H04L 43/08* (2013.01); *H04L 41/046* (2013.01); *H04L 67/1095* (2013.01); *G06F 9/455* (2013.01)

(58) Field of Classification Search
USPC ......................................................... 709/224
See application file for complete search history.

(56) References Cited

U.S. PATENT DOCUMENTS

| | | | |
|---|---|---|---|
| 2014/0237595 A1* | 8/2014 | Sridhara | ................. G06F 21/55 726/23 |
| 2014/0245443 A1* | 8/2014 | Chakraborty | ....... H04L 63/1425 726/23 |
| 2017/0075749 A1* | 3/2017 | Ambichl | ............. G06F 11/0748 |

OTHER PUBLICATIONS

Ribenzaft, Ran; "Distribute Messages Effectively in Serverless Applications", Mar. 31, 2018: Retrieved from the Internet on Oct. 29, 2019: https://epsagon.com/blog/distribute-messages-effectively-in-serverless-applications/.

* cited by examiner

*Primary Examiner* — Frantz B Jean
(74) *Attorney, Agent, or Firm* — A.C. Entis-IP Ltd.; Allan C. Entis

(57) ABSTRACT

A method of monitoring an application supported by a plurality of distributed resources, the method comprising: detecting a plurality of events transpiring in the resources generated by operation of the application, for each event collecting data for a selection of fields comprised in a fingerprint useable to identify the event, the selection comprising at least one conserved field that comprises conserved data present in an incoming call to the resource that triggers the event or an outgoing call from the resource that triggers an event in another resource; determining pairs of directly causally related events for which the respective fingerprints share the same conserved data; and using pairs of directly causally related events to monitor the application.

15 Claims, 3 Drawing Sheets

| Fields Optionally Comprised in Event Fingerprint for SNS 46 | | |
|---|---|---|
| Field | Description | Example |
| User-ID | Account ID number | 12345678 |
| Region for SNS 46 | Geographical Region of the service | Us-east-1 |
| Topic Name | Name of topic ("queue") within the SNS | Notice MyBlog |
| Message Subject | Title of message received for distribution | "hello world" |
| Operation | Messaging: receive message from publisher forward message to subscriber | Receive message data from Lambda 44-1<br>Forward message data to Lambda 44-2 |
| Input Payload "In-Pay" | Conserved Data: content of the data in the message received by SNS 46 that is to be distributed; may be hashed | The message data might be: "{'hello': 'world'}". Hash of message data: 6237EF667BC1CD4C03BB45B0E70397BC43D711FB<br>This same hash must appear in a causally related event e.g. as INPUT to Lambda 44-2 |
| Time stamp | Optionally time of reception/forwarding of message related to the event | |

FIG 2A

| Fields Optionally Comprised in Event Fingerprint for DynamoDB 52 | | |
|---|---|---|
| Field | Description | Example |
| User-ID | Account ID number | 12345678 |
| Region for DynamoDB 52 | Geographical Region of the Service | Us-east-1 |
| Table Name | Name of Table Within the DynamoDB | Good-Times |
| Item key | A Unique ID that identifies data, that is an "item", to be stored in The DB. | "hello world" |
| Operation | Non-relational data repository management: store/retrieve/delete/modify data | Store data received from Lambda 44-2 |
| Input Payload "In-Pay" | Conserved Data: payload, the "item", or item key received by DynamoDB with an instruction to operate on the item or item identified by the key; may be hashed | message payload from Lambda 44-1 to be stored: "{'hello': 'world'}"; Hash of message data: 6237EF667BC1CD4C03BB45B0E70397BC43D711FB<br>This same hash must appear in a causally related event e.g. in OUTPUT from Lambda 44-2 |
| Time stamp | Optionally time of reception/forwarding of message related to the event | Time of store invocation from Lambda 44-2 |

FIG 2B

| Fields Optionally Comprised in Event Fingerprint for Lambda 44-1 | | |
|---|---|---|
| Field | Description | Example |
| User-ID | Account ID number | 12345678 |
| Region Lambda 44-1 | Geographical Region of the Service | Us-east-1 |
| Lambda Name | Blog-Preprocessor | Preprocess post data from API 42-1 |
| Execution ID | Generated ID of the specific execution | 4bdb2ad0-b6d0-4fd6-ae87-8addb4b7ce42 |
| Operation | Function: process an argument in accordance with an expression to provide a result | Process message from API 42-1 to: extract authentication data for authentication in Auth0 48; transmit payload to SNS 46. |
| INPUT Payload "In-Pay" | Conserved Data: Argument passed to Lambda 44-1; may be hashed | Might be required to identify a causally related event of a resource e.g. API 42-1 that triggered the event? |
| OUTPUT Payload "Out-Pay" | Conserved Data: Result of Lambda expression; may be hashed | Might be required to identify a causally related event that the event triggers in another resource? e.g. DynamoDB 52 |
| Time stamp | Optionally time of reception/forwarding of message related to the event | |

FIG 2C

MONITORING CLOUD COMPUTING

RELATED APPLICATIONS

The present application claims the benefit under 35 U.S.C. 119(e) of U.S. Provisional Application 62/746,887, filed on Oct. 17, 2018, the disclosure of which is incorporated herein by reference.

FIELD

Embodiments of the invention relate to monitoring performance of software supported by, and operating in, a cloud computing environment

BACKGROUND

Cloud computing refers to processing data using computing resources from an ensemble of hardware and software computing resources that are considered to be located in a logical environment, referred to as a cloud, that is characterized by the feature that the resources in the environment, wherever the resources may happen to physically reside, are accessible for use via the internet. The hardware resources, which may be referred to as bare-metal resources comprise physical machines such as servers, processors, and communications network elements, on which the software computing resources run. The software computing resources comprise in addition to applications, and software programs that provide particular processing functionalities, software entities referred to as virtual computing resources. Virtual computing resources emulate, adopt the identities of, and are addressable as familiar bare-metal computing resources and comprise by way of example, virtual computers, referred to as virtual machines (VMs) or virtual servers, virtual storage, virtual load balancers, and virtual communications network elements that support communications between virtual and/or bare-metal computing resources.

Various commercial enterprises, such as by way of example, Amazon, Microsoft, Google, Apple, and Oracle, provide clouds that offer computing resources and services that may be rented. Private individuals may by way of example, rent from a cloud provider, software, virtual memory to store personal data, and/or virtual computers on which to run their own computer programs. Enterprises generally rent virtual computing resources from a cloud provider as Infrastructure-as-a-Service (IaaS), Platform-as-a-Service (PaaS), and/or SAAS (Software-as-a-Service).

When renting computing resources from a cloud provider to support a desired application a user, generally designated by an account number of an entity that the cloud provider invoices for supporting the application, is typically required to provide technical specifications for virtual computing resources that the user requires to support the application. For example, the user may have to specify random access memory (RAM), processor frequency, and minimum database space for servers that the application requires, and which servers have to communicate with each other to support the application. In a mode of cloud computing referred to as serverless computing a cloud provider relieves a user from having to provide technical specifications for virtual computing resources that the user needs to support a user application and assumes the tasks of specifying virtual machines, and how and when they operate and communicate with each other to support the user application. The user application operates by submitting requests to the cloud provider for performance of various functions as needed by the application, for which requests the cloud provider returns appropriate responses. How the cloud provider provides the responses and what virtual and/or bare metal computing resources the cloud provider uses to satisfy the responses are substantially opaque to the user.

It has become apparent that the serverless environment lends itself to supporting asynchronous operation of a user application and that asynchronous operation may be advantageous in increasing efficiency with which a user application operates and in reducing rental charges for using cloud resources. As a result, user applications operating in serverless environments are being configured to incorporate asynchronous operation. Asynchronous operation refers to operation in which an application does not have to halt activity to await a response to a request that it submits to any software resource or the cloud provider service.

Whereas in serverless computing a user is relieved of the often complex and time-consuming task of configuring a network of virtual resources to support a desired application, the opacity of the cloud provider operations, and possible asynchronous operation of the application may increase complexity and difficulty of monitoring performance of the application.

It is noted that the term serverless computing is somewhat of a misnomer and that real and virtual servers are required and used by a cloud provider to provide serverless computing. Serverless computing is referred to as serverless computing because a user "doesn't see" the servers and other cloud computing resources that operate in the background to support a user application.

SUMMARY

An aspect of an embodiment of the disclosure relates to providing a monitoring system, hereinafter referred to as TRACER for monitoring performance of a user application supported by a distributed system, optionally operating in a cloud computing environment. In an embodiment, TRACER comprises a collector and a backend, optionally cloud based, processing hub. The collector comprises executable instructions that are integrated into the user application and operate to detect events generated by operation of the application. An event is an instance in the user application of a process comprised in an application resource executing in response to a trigger from another resource or executing to trigger another resource of the application. An event in a given resource of the user application is triggered when another resource of the user application transmits calls or invokes, hereinafter generically referred to as calls, the given resource.

When the collector detects an event, the collector collects data, hereinafter referred to as event-ID data, which are values for components, also referred to as fields, of an event fingerprint, or fingerprint, that is useable to identify the event in accordance with an embodiment of the disclosure, and transmits the fingerprint to the TRACER hub. In an embodiment, the event-ID data associated with the event may comprise and/or be based on metadata, and/or payload data in an invocation or call message that triggers the event, and/or in a call or invocation message generated by the event to trigger another event. Metadata may by way of example include data, optionally referred to as user-ID data, identifying the user and/or user application, data, optionally referred to as resource-ID data, identifying the computing resource and/or process of the application resource generating the event, an IP address or host name of another resource with which the resource communicates in generating the event, a time stamp of a time at which the collector collects or transmits the event-ID data, and/or billed duration of the event, and may be different for different types of events.

The TRACER hub processes fingerprints from a plurality of events that it receives from the collector to determine sets of events that are directly or indirectly causally related. A first event is directly causally related to a second event if the first event triggers or is triggered by the second event. First and second events are indirectly causally related if they are comprised in different sequences of causally related events that share a same event. Directly causally related events are synchronous events, indirectly causally related events may be asynchronous events. In an embodiment, TRACER selects fields for event fingerprints so that if two events are causally related, a value for at least one field in the fingerprint of one of the events is identical to the value of at least one field in the fingerprint of the other of the events. Values that are expected to be identical in causally related events may be referred to as conserved values, and fields of a fingerprint that are intended to assume conserved values may be referred to as conserved fields. In an embodiment, the TRACER hub compares event fingerprints to determine which of the fingerprints share a conserved value and/or are otherwise sufficiently correlated to indicate that their respective associated events are directly causally related. TRACER processes the directly causally related events to determine sequences of directly, and optionally indirectly causally related events. A set of directly and, optionally indirectly, causally related events may be referred to as a trace. To facilitate processing event fingerprints to determine directly causally related events, collector agents and/or the TRACER hub may hash the value of at least one field of the fingerprint. In an embodiment, the at least one field in the event fingerprint comprises at least one conserved field.

Traces determined in accordance with an embodiment of the disclosure provide information on interdependence of actions performed by an application and may be used by TRACER to map the application architecture and generate a temporal map that indicates how the application operates and how application resources interact in real time. In an embodiment TRACER updates the application architecture and temporal maps substantially in real time. TRACER may use the traces and maps to monitor, and optionally display in a graphical user interface (GUI), operation of the application in real time and provide real time measures of quality of performance of the application and quality of service it provides. Generating and displaying traces in accordance with an embodiment of the disclosure enables a user to efficiently view and understand in real time, operation of the user application and identify application resource interactions that might disrupt or impair operation of the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

FIGS. 2A-2C show tables of fields for fingerprints that may be generated by collector agents for different types of events, in accordance with an embodiment of the disclosure.

DETAILED DESCRIPTION

Figure 1:
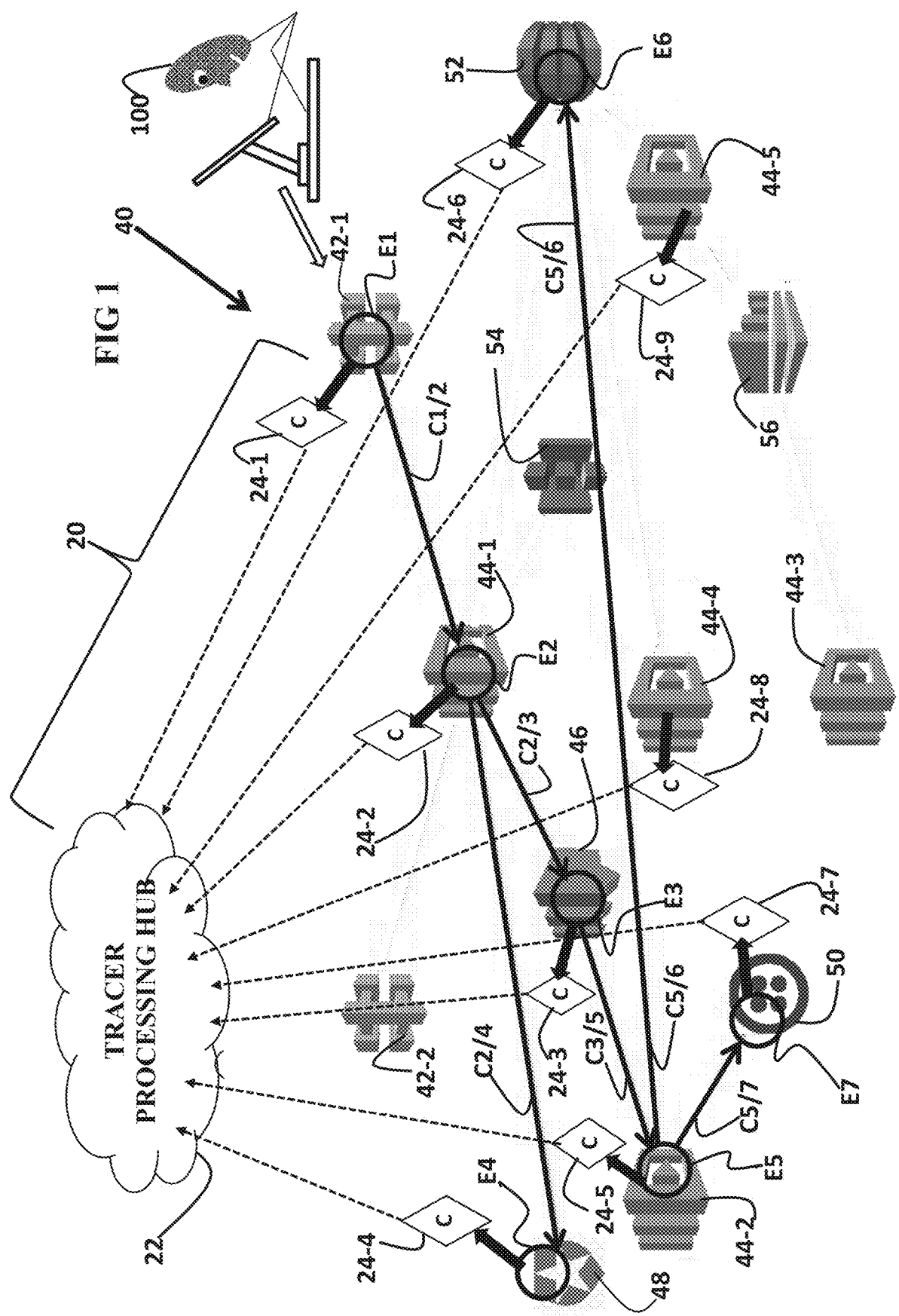
FIG. 1 schematically shows a portion of a blog site user application architecture and TRACER operating to monitor operation of the application, in accordance with an embodiment of the disclosure.

In the following detailed description, operation of TRACER in accordance with an embodiment is discussed with reference to FIG. 1 which schematically shows the TRACER coupled to a portion of a blog site production architecture.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which the embodiment is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins.

FIG. 1 schematically shows a TRACER 20 coupled to a portion of the architecture 40 of a user blog site production application to monitor operations of the application, which may also be referenced by the numeral 40. By way of example, application 40 is configured to operate in a cloud computing, optionally serverless cloud computing, environment.

Resources that support application 40 optionally comprise: application program interfaces (APIs), API 42-1 and API 42-2; web application request processors, optionally program request processors referred to as Lambda functions 44-1, 44-2, 44-3, 44-4, 44-5, which may be referred to generically as Lambda functions 44; a simple notification service, SNS 46; an authorization module 48, optionally an Auth0 authorizer referred to as Auth0 48; a cloud communication platform, optionally a Twilio communication platform, referred to as Twilio 50; a nonrelational database, optionally a DynamoDB database referred to as DynamoDB 52; cloud storage 54, optionally AWS S3 cloud storage referred to as S3 54; and a stream analyzer 56.

In accordance with an embodiment of the disclosure TRACER 20 optionally comprises a cloud-based processing hub 22 and a collector 24 having by way of example a plurality of collector agents 24-1, 24-2, ... 24-6, and 24-9, which may be referred to generically as collector agents 24. Collector agents 24-1, 24-2, 24-3, 24-4, and 24-9 are respectively coupled to API 42-1, Lambda 44-1, SNS 46, Auth0 48, Lambda 44-2, DynamoDB 52, Twilio 50, Lambda 44-4, and Lambda 44-5. Each collector agent 24 comprises code data and executable instructions that operate to detect events generated by the application resource to which it is coupled, and to process a detected event to collect event-ID data that provide values for fields of a fingerprint for the event, and transmit the fingerprint to hub 22. Any of various code instrumentation techniques may be used to configure the data and instructions that a collector agent 24 uses to detect events.

It is noted that whereas TRACER 20 is schematically shown in FIG. 1 and assumed to comprise virtual component entities, any or any combination of component entities of TRACER 20 in accordance with an embodiment, such as hub 22 and collector agents 24 may comprise and/or have access to any of various physical and/or virtual processors, memories, and/or communication interfaces that may be required to support functionalities for which the component entities are responsible. A component entity may be a physical or virtual entity or a combination of physical and virtual entities and may for example comprise or have access to a memory having any electronic and/or optical circuitry suitable for storing data and/or computer executable instructions. The memory may, by way of example, comprise or have access to any one, or any combination of more than one of a flash memory, random access memory (RAM), read only memory (ROM), and/or erasable programmable read-only memory (EPROM). Similarly, a component entity may comprise and/or have access to a processor having any electronic and/or optical processing circuitry configured to operate and provide functionalities that the component entity may require. The processor may by way of example comprise any one, or any combination of more than one of, a standard x86 processor, microprocessor, an application specific circuit (ASIC), field programmable array (FPGA) and/or system on a chip (SOC).

In accordance with an embodiment of the disclosure event-ID data collected for different types of events may be different, and different collector agents 24 coupled to different resources may accordingly be configured differently. By way of examples, FIGS. 2A, 2B, and 2C show tables of fields for which collector agents 24 collect event-ID data for different resources of application 40. FIG. 2A shows a table of fingerprint fields for which collector agent 24-3 collects data for events generated by SNS 46. FIG. 2B shows a table of fingerprint fields for which collector agent 24-6 collects data for events generated by DynamoDB 52. FIG. 2C shows a table of fingerprint fields for which collector agent 24-2 collects data for events generated by Lambda 44-1. Fields in the fingerprints that may assume conserved values, in accordance with an embodiment of the disclosure include input and/or output payloads (In-Pay and/or Out-Pay) user-ID, region, resource-name and/or resource operation.

By way of example, of operation of TRACER 20 in collecting event-ID data for events detected during operation of application 40 and processing event-ID data to identify directly and indirectly causally connected events, and traces, assume a sequence of events that are detected by collector agents 24, which are triggered by, optionally, new post data posted to application 40 via API 42-1 by a blogger 100 subscribed to use application 40. The new post data propagates from API 42-1 to Lambda 44-1, which in turn transmits the data to SNS 46 which calls Auth0 48 for authorization of blogger 100. SNS 46 also transmits the new post data received from Lambda 44-1 for further processing by Lambda 44-2. Lambda 44-2 transmits the new post data for storage by DynamoDB 52 and processing by Twilio 50.

Let the events generated by the new post data in resources of application 40 be schematically represented by bold circles E1-E7 located on the respective resources in which the events transpire. A solid block arrow connecting an event to a collector agent 24 coupled to the resource in which the event transpires represents event-ID data collected by the collector agent for determining a fingerprint for the event. Pairs of directly, causally related events are connected by an arrow that connects the events. For a given pair of directly causally related events in which a first event of the pair triggers a second event of the pair, the arrow connecting the events points from the first event of the pair to the second event of the pair and is labeled by the alphanumeric label comprising the letter C followed by the numerals labeling the first and second events separated by a slash. For example, event E5 is directly causally related to and triggers to E6 and the arrow connecting E5 and E6 points to E6 and is labeled C5/6.

In accordance with an embodiment of the disclosure, for each event E1-E7 detected by a collector agent 24 the collector collects event-ID data for an event-D comprising, resource-ID data, for at least one field of the fingerprint that identifies the resource to which the collector agent is coupled and in which the event transpires, and conserved event-ID data for at least one conserved field of the fingerprint. Event-ID data also generally comprises a time stamp, and may comprise resource-ID data that identifies a resource that triggered the event, and/or resource-ID data that identifies a resource that the event triggers. Resource ID data that identifies the resource in which an event transpires may by way of example, comprise data such as, User-ID, region of the resource, and/or a name for the resource. Conserved data generally comprises payload data that is transmitted between two directly causally related events.

By way of example, for the sequence of events generated by the new post from blogger 100 posted through API 42-1, for event E1, collector agent 24-1 may collect event-ID data comprising user-ID, a resource ID for API 42-1, an ID for blogger 100, the new post, and/or a time stamp for a time at which the new post was posted. Let the user-ID be represented by "U-ID", the ID of API 42-1 be represented by "ID42-1", the ID for blogger 100 by "BLG-100", and payload data based on the posted data that enables the new post to be posted, by "PD". Let the fingerprint for API 42-1 be represented by FIP/E1. Then FIP/E1 may be represented by the feature vector {U-ID, ID42-1, BLG-100, PD, . . . TSP-1}, where the ellipsis, ". . .", represents additional data that may be advantageous in identifying event E1 or events directly causally related to event E1 and "TSP-1" is a timestamp associated with E1. For determining an event or events directly causally related to event E1, BLG-100 and PD may be conserved data. For event E2 that collector agent 24-2 detects in Lambda 44-1, the collector agent may collect event-ID data comprising user-ID, U-ID, resource-ID data for Lambda 44-1, represented by "ID44-1", an input payload, "In-Pay2", comprising an argument or arguments passed to Lambda 44-1 by another resource of application 40 that triggers event E2, and an output payload, "Out-Pay2". Out-Pay2 comprises a result or results that Lambda 44-1 provides by processing input payload In-Pay2. For determining an event or events directly causally related to event E2, In-Pay2 and Out-Pay2 may be conserved data. Similar to FIP/E1, if FIP/E2 represents the fingerprint for event E2, FIP/E2 may be represented by a feature vector {U-ID, ID44-1, In-Pay2, Out-Pay2, . . . TSP-2}. It is noted that if Out-Pay2 is the same as In-Pay2, as might occur if Lambda 44-1 sends duplicates of In-Pay2 to trigger events in other resources of application 40, collector agent 24-2 may collect only In-Pay2 for FIP/E2. However, for the scenario illustrated in FIG. 1, assume by way of example, that Lambda 44-1 is configured to forward all of In-Pay2 to SNS 46 but only a portion of In-Pay2 comprising the identity BLG-100 of subscriber 100, to Auth0 48 for authentication. As a result, Lambda 44-1 generates two different output payloads that may serve as conserved data for determining direct causality relationships for event E2. Let the output payload that is a copy of In-Pay2 be represented by Out-Pay2 and the output payload that comprises BLG100 but not PD be represented by Out-Pay2*. FIP/E2 may then be represented by a feature vector {U-ID, ID44-1, In-Pay2, Out-Pay2*, Out-Pay2, . . . , TSP-2}.

Similarly, if a fingerprint for E3 that occurs in SNS 46 is represented by FIP/E3, FIP/E3 may be represented by a feature vector {U-ID, ID46, In-Pay3, Out-Pay3, . . . TSP-3}, assuming that SNS 46 distributes the same payload that it receives Out-Pay3=In-Pay3, and FIP/E3 may be represented by {U-ID, ID46, In-Pay3, . . . TSP-3}. In-Pay3 is expected to be a conserved field. If a fingerprint for E4 that occurs in Auth0 48 is represented by FIP/E4, FIP/E4 may be represented by a feature vector {U-ID, ID48, In-Pay4, Out-Pay4, . . . TSP-4}. In FIP/E4, In-Pay4 may be an identity, such the ID for subscriber 100, BLG-100, that Auth0 48 receives in a payload of an input trigger message for authenticating. Out-Pay4 may be a result of authenticating the ID. In-Pay4 is expected to be a conserved field. FIP/E5 that represents a fingerprint for E5 that occurs in Lambda 44-2 may be represented by the feature vector {U-ID, ID44-2, In-Pay5, . . . TSP-5} and FIP/E6 that represents a fingerprint for E6 that occurs in DynamoDB 52 may be represented by the feature vector {U-ID, ID52, In-Pay6, . . . TSP-5}.

In an embodiment each collector agent 24 transmits the fingerprints that the collector agent determines for events that the collector agent detects to TRACER hub 22 for processing to determine which events are causally related. Optionally each fingerprint comprises at least one field whose value has been hashed either by the collector agent 24 that generated the fingerprint or by TRACER hub 22. Tracer hub may receive fingerprints from events generated in applications other than application 40 schematically shown in FIG. 1. To determine causally related events in application 40, TRACER hub 22 may filter events to select only fingerprints that exhibit metadata having user and/or resource-IDs associated with application 40. The hub may then pair events that exhibit identical conserved data to identify events that are candidates for being causally related. For example, hub 22 may identify events E1 and E2 as potentially directly causally related because input payload In-Pay2 that triggers E2 comprises copies of the ID, BLG100, of blogger 100, and post data PD, which are expected to be conserved values in causally related events, are found in fingerprint FIP/E1. In an embodiment TRACER hub 22 may determine that the potentially causally related events are directly causally related if in addition a difference in their respective time stamps is less than a suitable upper bound time difference, and/or there are no other candidate events have occurred in application 40 that might have provided BLG100 and PD.

Tracer hub 22 may determine, optionally subject to timing constraints on timestamps TSP2 and TSP4, that E2 is in turn directly causally related to E4 because In-Pay4 of fingerprint FIP/E4 and Out-Pay2* of fingerprint FIP/E2 for event E2 both include the ID BLG100 of blogger 100. The hub may similarly determine that E2 is also directly causally related to E3 because In-Pay3 of fingerprint FIP/E3 and Out-Pay2 of fingerprint FIP/E2 for event E2 both include the ID BLG100 of blogger 100 and post data PD. Hub 22 similarly may determine that event E3 and E5 are directly causally related, and that E5 is directly causally related to E6 and E7.

Responsive to the determination of the directly causally related events described above TRACER 20 identifies a trace of causally connected events indicated by arrows C1/2, C2/4, C2/3, C3/5, C5/6, and C5/7, which exhibits branch-points at events E2 and E5 at which events the trace bifurcates. Events E1, E2, and E4 form a branch of the trace that comprises a sequence of directly causally related synchronous events as do for example events E1, E2, E3, and E6. Events in the different branches, for example E4 and E3 or E4 and E5 are indirectly asynchronous events. It is noted that whereas the trace shown in FIG. 1 exhibits branch points at which the trace bifurcates into two branches of directly causally related events, a trace determined in accordance with an embodiment of the disclosure may exhibit branchpoints at which the trace branches into more than two branches.

In an embodiment TRACER 20 generates and displays event traces such as that shown in FIG. 1 to provide a visualization of the operation of an application that TRACER is used to monitor that is advantageous in enabling a user to relatively efficiently and rapidly detect disturbances and inefficiencies in the operation of the application. The determination of and matching of event fingerprints responsive to conserved values and fields in accordance with an embodiment of the disclosure is advantageous for displaying maps of event traces of the application operations in real time. The real time processing and display that TRACER provides may allow the user to detect, and possibly intervene to stop, improve and/or correct operation of the application in performing a task for which the application is configured while the task is being performed, or within a time span of a few typical time periods that the application requires to perform the task.

There is therefore provided in accordance with an embodiment of the disclosure, a method of monitoring an application supported by a plurality of distributed resources, the method comprising: detecting a plurality of events transpiring in the resources generated by operation of the application, each event comprising an instance of a process in a resource of the application executing in response to an incoming call to the resource from another resource that triggers the event or executing to generate an outgoing call from the resource that triggers an event in another resource; for each event collecting data for a selection of fields comprised in a fingerprint useable to identify the event, the selection comprising at least one conserved field that comprises conserved data present in the incoming call to the resource or the outgoing call from the resource; determining pairs of directly causally related events for which the respective fingerprints share the same conserved data; and using pairs of directly causally related events to monitor the application.

Optionally, the conserved data in the incoming call comprises an argument passed in the incoming call or the outgoing call. Additionally, or alternatively the at least one conserved field may comprise at least one or any combination of more than one of a user-ID, a geographical region of the resource, a name of the resource, and/or a designation of an operation that the resource performs.

In an embodiment, monitoring the application comprises determining a trace of events comprising at least one sequence of directly causally related events and using the trace to monitor the application. Optionally, the trace comprises at least one branch point at which the trace branches to at least two different branches of sequences of directly causally related events. Optionally, an event in one of the at least two different branches is asynchronous with respect to an event in another of the at least two different branches.

In an embodiment of the disclosure, monitoring comprises displaying the trace.

In an embodiment of the disclosure, the resources operate in a cloud computing environment.

There is further provided in accordance with an embodiment of the disclosure a system for monitoring an application supported by a plurality of resources operating in a cloud computing environment, the system comprising: a hub; a collecting agent coupled to each of the resources and comprising computer executable instructions executable to: detect events transpiring in the resource to which the collecting agent is coupled; for each detected event collect data for a selection of fields comprised in a fingerprint useable to identify the event, the selection comprising at least one conserved field that comprises conserved data present in an incoming call to the resource or an outgoing call from the resource; and transmit the fingerprint to the hub; wherein the hub comprises computer executable instructions executable to process the fingerprints the hub receives from the collecting agents to determine pairs of directly causally related events for which the respective fingerprints share the same conserved data and use pairs of directly causally related events to monitor the application.

Optionally, the conserved data in the incoming call comprises an argument passed in the incoming call or the outgoing call. Additionally, or alternatively the at least one conserved field may comprise at least one or any combination of more than one of a user-ID, a geographical region of the resource, a name of the resource, and/or a designation of an operation that the resource performs.

In an embodiment of the disclosure, monitoring the application comprises determining a trace of events comprising at least one sequence of directly causally related events and using the trace to monitor the application. Optionally, the trace comprises at least one branch point at which the trace branches to at least two different branches of sequences of directly causally related events. An event in one of the at least two different branches may be asynchronous with respect to an event in another of the at least two different branches.

In an embodiment, monitoring comprises displaying the trace.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the disclosure. The described embodiments comprise different features, not all of which are required in all embodiments of the disclosure. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method of monitoring an application supported by a plurality of distributed resources, the method comprising:
   detecting a plurality of events transpiring in the resources generated by operation of the application, each event comprising an instance of a process in a resource of the application executing in response to an incoming call to the resource from another resource that triggers the event or executing to generate an outgoing call from the resource that triggers an event in another resource;
   for each event collecting data for a selection of fields comprised in a fingerprint useable to identify the event, the selection comprising at least one conserved field that comprises conserved data present in the incoming call to the resource or the outgoing call from the resource;
   determining pairs of directly causally related events for which the respective fingerprints share the same conserved data; and
   using pairs of directly causally related events to monitor the application.

2. The method according to claim 1 wherein the conserved data in the incoming call comprises an argument passed in the incoming call or the outgoing call.

3. The method according to claim 1 wherein the at least one conserved field comprises at least one or any combination of more than one of a user-ID, a geographical region of the resource, a name of the resource, and/or a designation of an operation that the resource performs.

4. The method according to claim 1 wherein monitoring the application comprises determining a trace of events comprising at least one sequence of directly causally related events and using the trace to monitor the application.

5. The method according to claim 4 wherein the trace comprises at least one branch point at which the trace branches to at least two different branches of sequences of directly causally related events.

6. The method according to claim 5 wherein an event in one of the at least two different branches is asynchronous with respect to an event in another of the at least two different branches.

7. The method according to claim 4 wherein monitoring comprises displaying the trace.

8. The method according to claim 1 wherein the resources operate in a cloud computing environment.

9. A system for monitoring an application supported by a plurality of resources operating in a cloud computing environment, the system comprising:
   a hub;
   a collecting agent coupled to each of the resources and comprising computer executable instructions executable to:
      detect events transpiring in the resource to which the collecting agent is coupled;
      for each detected event collect data for a selection of fields comprised in a fingerprint useable to identify the event, the selection comprising at least one conserved field that comprises conserved data present in an incoming call to the resource or an outgoing call from the resource; and
      transmit the fingerprint to the hub;
   wherein the hub comprises computer executable instructions executable to process the fingerprints the hub receives from the collecting agents to determine pairs of directly causally related events for which the respective fingerprints share the same conserved data and use pairs of directly causally related events to monitor the application.

10. The system according to claim 9 wherein the conserved data in the incoming call comprises an argument passed in the incoming call or the outgoing call.

11. The system according to claim 9 wherein the at least one conserved field comprises at least one or any combination of more than one of a user-ID, a geographical region of the resource, a name of the resource, and/or a designation of an operation that the resource performs.

12. The system according to claim 9 wherein monitoring the application comprises determining a trace of events comprising at least one sequence of directly causally related events and using the trace to monitor the application.

13. The system according to claim 12 wherein the trace comprises at least one branch point at which the trace branches to at least two different branches of sequences of directly causally related events.

14. The system according to claim 13 wherein an event in one of the at least two different branches is asynchronous with respect to an event in another of the at least two different branches.

15. The system according to claim 12 wherein monitoring comprises displaying the trace.

\* \* \* \* \*